United States Patent [19]

Svatek et al.

[11] 4,132,471

[45] Jan. 2, 1979

[54] EXPANDABLE SELF-DEVELOPING CAMERA

[75] Inventors: Thomas A. Svatek, Carlisle; Richard R. Wareham, Marblehead, both of Mass.

[73] Assignee: Polaroid Corporation, Cambridge, Mass.

[21] Appl. No.: 784,247

[22] Filed: Apr. 4, 1977

[51] Int. Cl.² .......................................... G03B 17/50
[52] U.S. Cl. .................................... 354/86; 354/126; 354/187
[58] Field of Search ................................... 354/83–86, 354/126, 187, 192, 193, 288

[56] References Cited

U.S. PATENT DOCUMENTS

| 2,496,630 | 2/1950  | Land ..................................... 354/86 |
| 2,873,658 | 2/1959  | Land ..................................... 354/86 |
| 3,225,670 | 12/1965 | Friedman et al. ................... 354/86 X |
| 3,460,452 | 8/1969  | Land ..................................... 354/86 |
| 3,650,188 | 3/1972  | Whall .................................. 354/187 |
| 3,665,831 | 5/1972  | Harvey ............................... 354/187 |
| 3,988,752 | 10/1976 | Winkler et al. .................. 354/187 X |

Primary Examiner—John Gonzales
Attorney, Agent, or Firm—John S. Vale

[57] ABSTRACT

An extensible and retractable compact self-developing camera including a first camera section for exposing and applying pressure to a self-developing film unit and a second camera section coupled in telescoping relation to the first camera section for mutual movement in opposite directions between extended and retracted positions. When extended, the first and second camera sections cooperate to form a film retention and/or imbibition chamber for receiving film units advanced thereinto by a pair of pressure applying rollers. In the retracted configuration, the second camera section slides over a major portion of the first camera section and forms a protective covering over at least the optical elements mounted thereon.

14 Claims, 10 Drawing Figures

EXPANDABLE SELF-DEVELOPING CAMERA

BACKGROUND OF THE INVENTION

1. Field of the Invention

The present invention relates to the field of photography and, more particularly to compact self-developing camras.

2. Description of the Prior Art

The terms — compact, pocket size, miniature, or subminiature — as used in this disclosure in connection with self-developing cameras are descriptive of the relatively small physical size of both the cameras and the small format self-developing film units used therein. Small format means that such film units have image forming areas more closely approximating a 35 mm frame than the much larger "snap-shot size" frame.

There are a number of compact or pocket size cameras presently on the market that use conventional (not self-developing) 35 mm or 110 form film. Characteristically, these cameras are small in size and wieght, highly automated in terms of exposure control and are generally rugged in construction.

Generally, the 110 format cameras have such a small lens to film plane distance that the objective lens is mounted on a fixed lens board which does not have to be retracted into the housing for storage. On the other hand, some 35 mm cameras are of the "folding" type which include a lens board and bellows assembly which is movable between extended and retracted positions.

In order to eliminate the need for a separate carrying case to protect the camera optics and/or other externally mounted and rather delicate mechanisms, some of these cameras have self-contained telescoping or expansible camera housings or bodies which expose or uncover the optics and/or mechanisms when extended and form a protective casing over these structures when they are closed or retracted.

For representative examples of such conventional pocket size cameras having full or partial covering protective expansible housings reference may be had to U.S. Pat. Nos. 3,680,455; 3,864,705; 3,950,771; and 3,987,469.

The above-noted pocket cameras are not self-developing cameras. In addition to the optics, they include automatic exposure control devices and a film advance mechanism that is subject to rather light loading in operation.

A major problem area in providing a pocket size self-developing camera is that in addition to the optics and automatic exposure control devices it also must include a pressure-applying mechanism, such as a pair of rollers, for processing the film unit after exposure, a relatively heavy duty film transport system for advancing an exposed film unit through the pressure rollers and, if the film unit is of the type which does not include a self-contained total light opacification system, a light excluding imbibition chamber in which the film unit is held for a short time following pressure application to prevent fogging while the development and diffusion transfer process is in progress.

Most of the compact or smaller size self-developing cameras known in the prior art are designed for use with "instant slides", i.e. full color transparency film. In general, these film units do not include a complete self-contained post pressure-applying light-shielding system and must be held for the short imbibition period in a camera mounted imbibition chamber.

For representative examples of the prior art relating to compact instant slide cameras, reference may be had to U.S. Pat. Nos. 2,854,903; 3,225,670; 3,350,990; 3,369,469; 3,369,470; 3,421,423; 3,437,023; 3,437,024; 3,446,127; 3,446,131; 3,455,222; 3,525,293; 3,541,937; 3,541,938; 3,541,939; 3,541,940; 3,575,081; 3,614,920; 3,636,844; and 3,648,527. Also see the copending application of J. J. Driscoll, et al, Ser. No. 749,511, filed Dec. 10, 1976 and assigned to the same assignee as the present application.

The addition of the imbibition chamber in alignment with the rollers creates the problem of increasing camera size. While some of the above-noted instant slide cameras have fixed chambers, some cameras make use of a folding or self-storing chamber so that the camera approaches pocket size at least in the inoperative position. For examples of other self-developing cameras with folding or expansible imbibition chambers see U.S. Pat. Nos. 2,467,320; 3,618,493; 3,650,188; 3,653,308; 3,702,580; 3,748,990; and 3,852,781.

It is also well known in the art to provide self-developing cameras which achieve compactness by providing folding or expansible and retractable housing sections and to include as part of the housing sections portions thereof that serve to protect, when folded or closed, the camera optics and/or other delicate mechanisms. Representative examples of such prior art may be found in U.S. Pat. Nos. 2,590,164; 2,880,658; 2,930,301; 3,194,137; 3,677,160; 3,691,920; 3,706,267; 3,737,315; 3,810,211; 3,680,445; 3,864,705; and 3,950,771.

All of the above-noted self-developing cameras in this section have at least one major drawback. Some cameras do not even come close to approaching true pocket size. Others do not include imbibition chambers and thus cannot be used to process self-developing transparency film units that do not have self-contained total light opacification systems. Still others do not include a self-contained protective casing for the optics and require the use of a separate carrying case for protection against damage. Some of those cameras that do approach pocket size tend to have a thin elongated shape and are not necessarily easily stored and retained in a shirt pocket. Also, some pocket cameras achieve small physical size by using 110 format film (13 mm × 17 mm frame) which inherently limits the size of an image that can be projected onto a viewing screen or limits quality prints to snap shot size photos.

SUMMARY OF THE INVENTION

The present invention provides a folding or collapsible "shirt pocket size" self-developing film camera for exposing and processing small format (approximately 35 mm × 35 mm frame) self-developing film units, preferably "instant slides", and includes an expansible and retractable housing or chamber section that serves as both an imbibition or film retention chamber, when extended, and a protective casing for the optics and other mechanisms when retracted.

In its folded and fully retracted positions, the exterior dimensions of the camera are approximately H 3¼" × W 3¼" × D 1". Advantageously, the generally square shape allows the camera to be inserted completely into a shirt pocket such that it is much more likely to be retained in the pocket and impose less restraint on the user's physical activity than some of the thin elongated pocket cameras which inherently may be only partially inserted into the pocket.

Although the camera is very small in physical size when closed, it is configured to be erected into an operative configuration that allows the use of a film unit having an image-forming area measuring approximately 35 mm × 35 mm. This format provides in excess of 5.5 times the image-forming area than the 110 format. Therefore one does not pay the penalty of limits on projection and print enlargement size for the convenience of having a shirt pocket size camera.

Also, camera weight and physical size are reduced, manufacturing is simplified and cost savings are realized by having the expansible and retractable chamber section serve as both an imbibition or film unit retention chamber and a self-contained protective casing.

The camera embodying the present invention may be characterized as being the folding, collapsible, extensible and/or retractable type.

It includes a first camera section which is essentially a folding compact self-developing camera section including the means for exposing and processing (applying pressure to the film unit to effect processing fluid distribution) and a hollow second camera section coupled to the first section in telescoping relation thereto for mutual relative movement between an extended position wherein the second section forms an aligned extension of the first section and serves in cooperation with the first section, as a film retention or imbibition chamber and a retracted position wherein the second section slides over or receives a major portion of the first section (in its folded configuration) to form a protective casing over the optics and certain other exposed mechanisms.

The first camera section includes a base housing section having a chamber and structure therein for receiving a cassette holding a stack of self-developing film units and locating the forwardmost film unit in a stack in position for exposure, a pivoting lens board and bellows assembly mounting and objective lens assembly and other exposure mechanisms including a shutter and a photocell detector, a folding viewfinder assembly, and a pair of pressure applying rollers and film transport devices including a manually actuable film pick and roller drive mechanism.

The lens board and bellows assembly pivot between an erected forwardly extending operative position to space the objective lens and other components thereon at the proper distance from the film or exposure plane and a folded position wherein it fits into a recessed area in the base section. The viewfinder comprises an objective or forward lens mounted on the lens board for pivotal movement between an upstanding erected position and a folded position where it sits in a recess provided in the lens board and a rear or eye lens which is mounted in a recess in the base section for movement between erected and folded positions.

The second camera section is formed as a hollow chamber that is open at one end. It is coupled to the base portion of the first section with the open end of the chamber in communication with the bite line of the pressure applying rollers mounted on the end of the base portion for movement between its extended imbibition chamber position and its retracted protective casing position. The opposite or closed end of the second section has a light-sealed door or film withdrawal opening therein for removing the film units.

In a preferred embodiment, the camera also includes structure for automatically ejecting processed film units from the imbibition chamber, through the withdrawal opening, in response to moving the first and second camera sections from the extended position toward the retracted position. Also provisions are made for mounting a flash unit socket on the second camera section near the upper closed end of the chamber. Advantageously, this positions the flash unit off to the side of the lens axis when the second section is extended to minimize the well known "red eye" effect associated with color flash photography.

Additional features and characteristics of the camera embodying the present invention will be described later in the disclosure.

Therefore it is an object of the present invention to provide a compact self-developing camera which includes a movably mounted section that forms at least a major portion of a film retention or imbibition chamber, when located in a first position, and forms protective casing for the camera optics and/or other mechanisms and devices when located in a second positon.

It is another object to provide a "shirt pocket size" folding and/or extensible self-developing camera for use with transparency or "instant slides" type self-developing film units having an image forming area that is substantially larger than the image-forming area of 110 format conventional film units and includes a movably mounted camera section that forms a major portion of a film retention and/or imbibition chamber when extended and a protective casing for the camera when retracted.

Yet another object is to provide such a shirt pocket size self-developing camera wherein the movably mounted section is coupled to a base section of the camera for telescoping or nesting sliding movement relative thereto between its said extended and retracted positions and wherein a major portion of said base section and structure mounted thereon is protectively covered by said movable section located in its retracted position.

Still another object is to provide a shirt pocket size camera comprising a first section including a folding compact self-developing camera portion and a hollow second section coupled to the first section in telescoping relation for movement between an extended position where it cooperates with the first section to form a film retention and/or imbibition chamber and a retracted position where it slides over and protectively covers a major portion of the first section in its folded configuration.

Another object is to provide such a shirt pocket camera including a flash unit socket mounted on the second section to locate a flash unit mounted therein off the camera's optical axis for the purpose of minimizing the "red eye" effect.

Still another object is to provide such a shirt pocket sized camera that is substantially square in its height and width dimensions when the camera is collapsed or retracted to better fit into and be retained in a small clothing pocket, such as a shirt pocket.

Yet another object is to provide such a shirt pocket camera that includes structure for automatically ejecting film units from the retaining or imbibition chamber in response to moving the camera sections from the extended position toward the retracted position.

Other objects of the invention will, in part, be obvious and will, in part, appear hereinafter.

BRIEF DESCRIPTION OF THE DRAWINGS

For a fuller understanding of the nature and object of the invention, reference should be had to the following detailed description taken in connection with the accompanying drawings wherein.

DESCRIPTION OF THE PREFERRED EMBODIMENT

Figure 1:
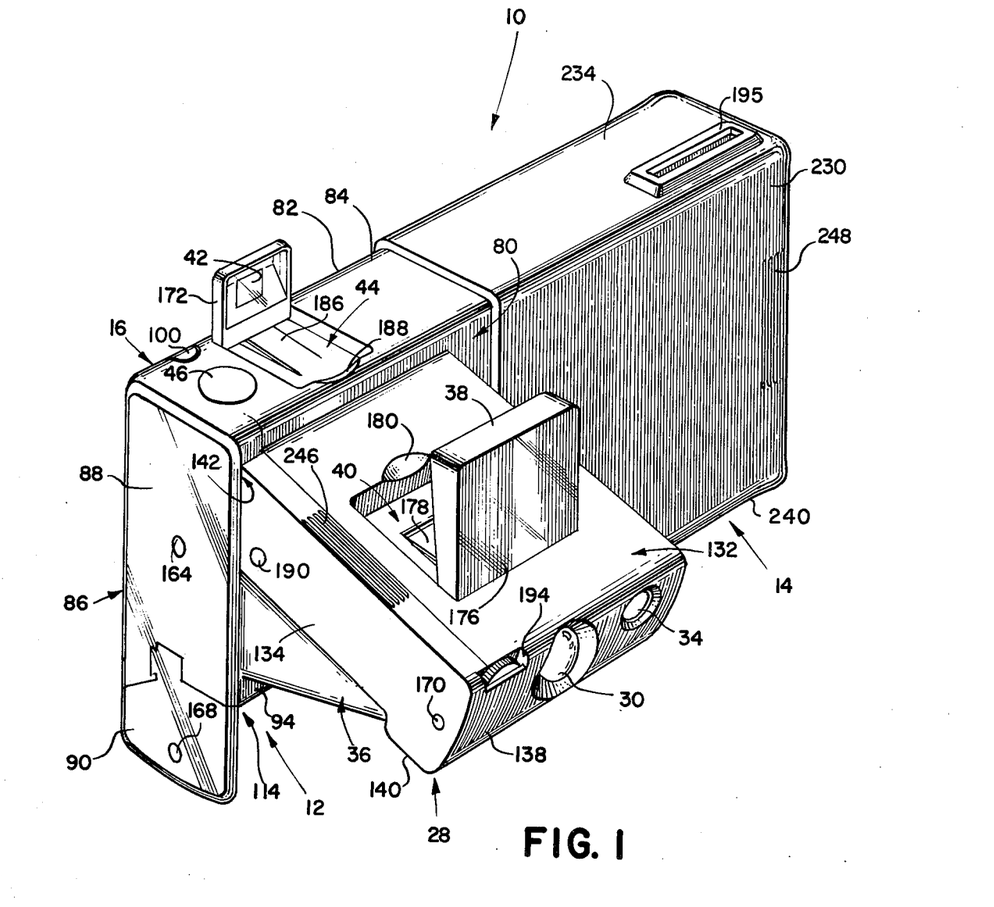
FIG. 1 is a perspective view of a compact self-developing camera embodying the present invention shown in its fully extended and erected operative configuration.
Figures 2, 3, 4:
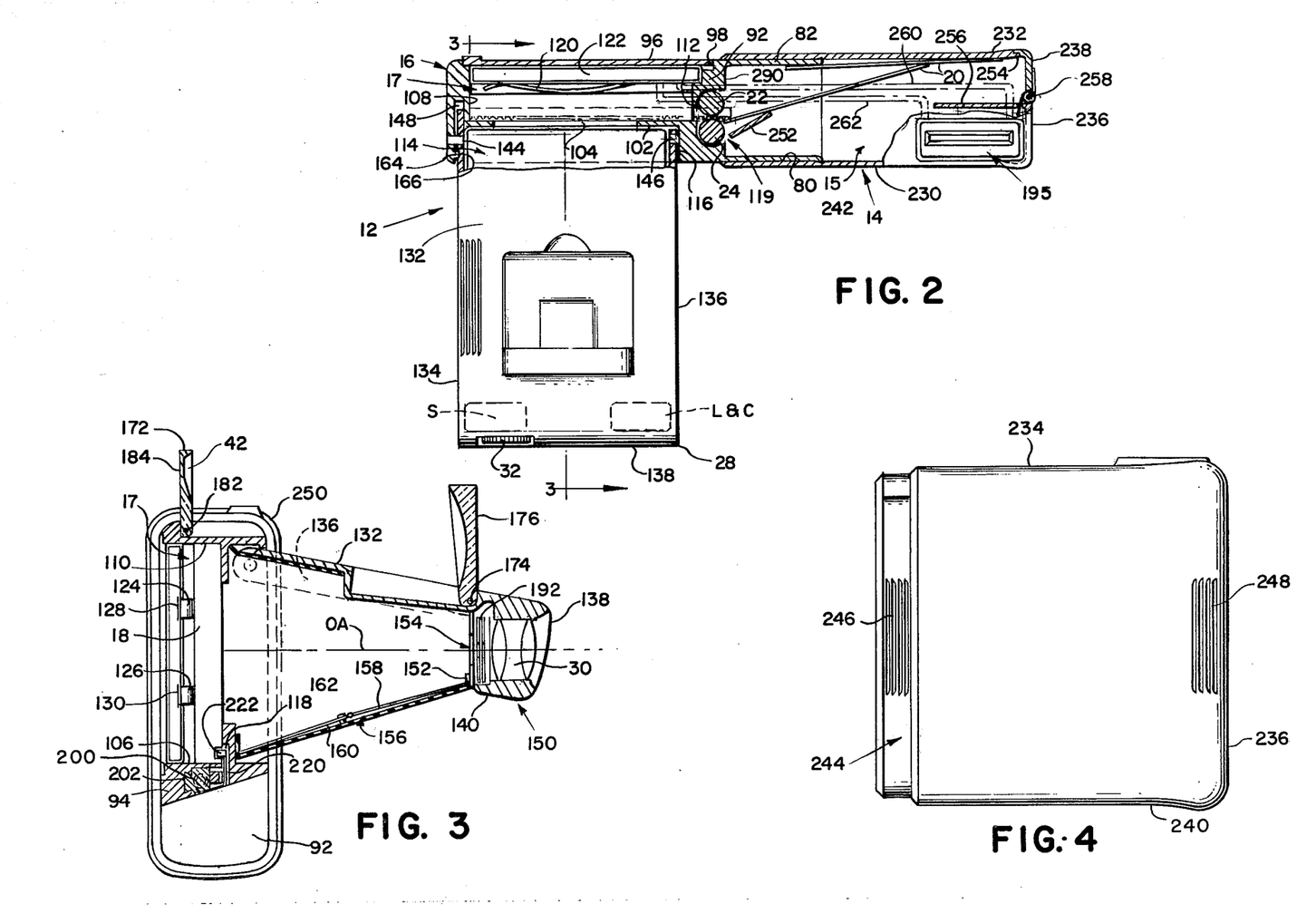
FIG. 2 is a top plan view, partly in section, of the camera shown in FIG. 1.
FIG. 3 is a side elevational view, partly in section, of the camera shown in FIG. 1.
FIG. 4 is a front elevational view of the camera embodying the present invention shown in its fully retracted or closed configuration.

A compact, "shirt pocket size" foldable and collapsible self-developing camera 10, embodying the present invention is shown generally in its extended and erected operative configuration in FIGS. 1, 2 and 3 of the drawings.

Figure 5:
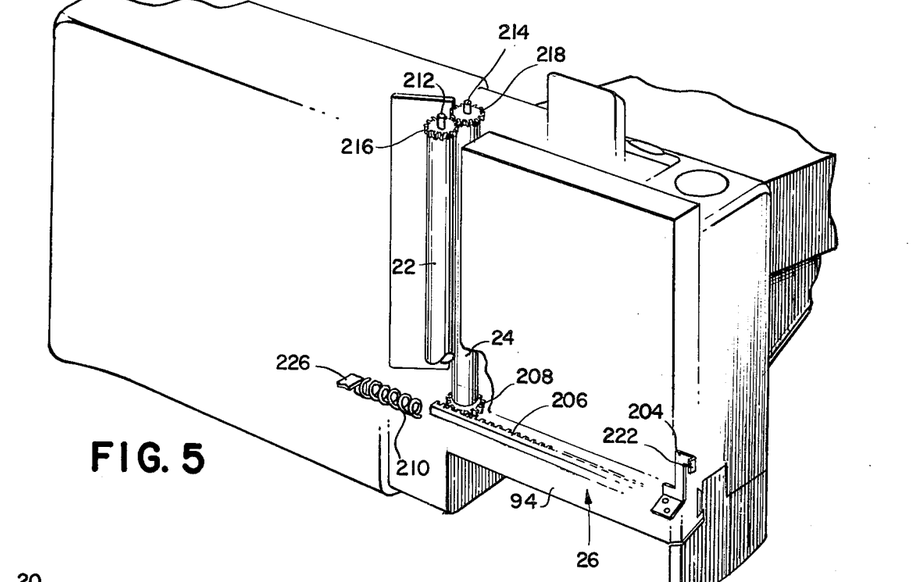
FIG. 5 is a perspective view of the camera's film transport, pressure-applying rollers and roller drive mechanism with portions of the camera surrounding such structure shown in phantom lines.
Figures 6, 7, 8:
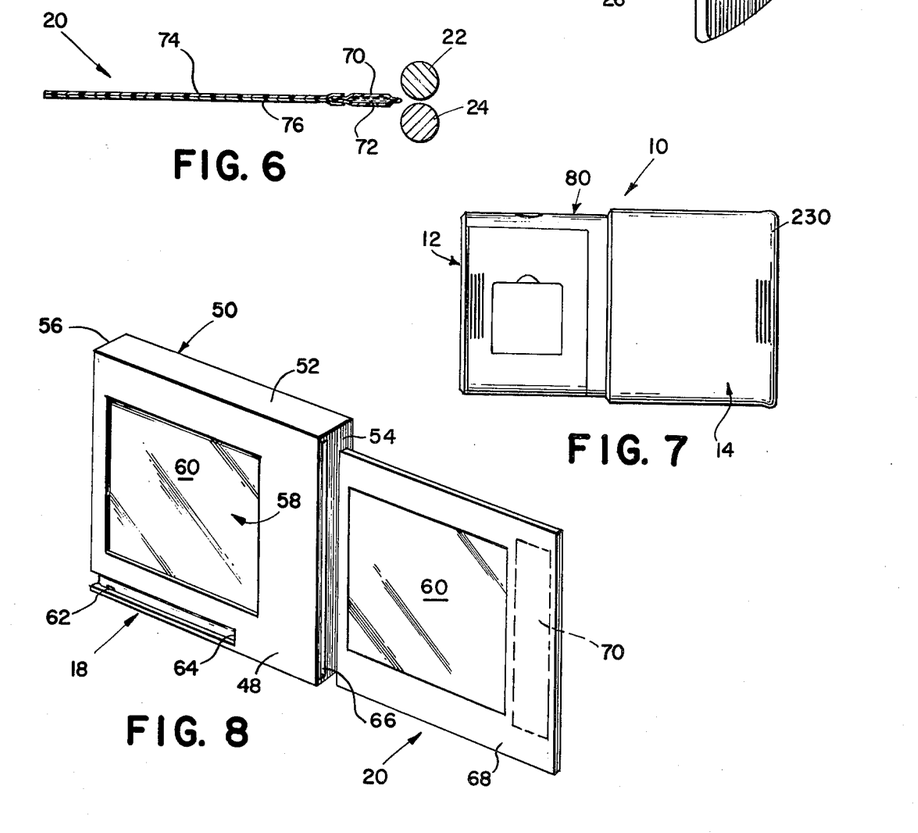
FIG. 6 is a cross-sectional diagrammatic view of a typical self-developing film unit and a pair of pressure-applying rollers adapted for use in the camera embodying the present invention.
FIG. 7 is a front elevational view of the camera shown in FIG. 1 with its lens board, bellows, and viewfinder assembly shown in the folded configuration.
FIG. 8 is a perspective view of a self-developing film unit and film container therefor which are suitable for use in the camera embodying the present invention.

Camera 10 comprises a first camera section 12 which is essentially a small compact folding self-developing camera for exposing and processing (transporting and applying compressive pressure) a small format self-developing film unit and a second camera section 14 coupled to section 12, in telescoping relation for mutual movement between the extended position shown in FIGS. 1, 2, 3, 5 and 7, wherein it cooperates with section 12 to form a film retention and/or imbibition chamber 15 and the closed or retracted position of FIG. 4 wherein it slides over and protectively encloses a major portion of section 12 located in its folded configuration as shown in FIG. 7.

When the camera 10 is fully closed or retracted as shown in FIG. 4, it measures approximately H 3¼ × W 3¼ × 1". Because of its small overall size and generally square (H × W) shape, the closed camera 10 may be easily, fully and snugly inserted in a relatively small pocket, for example, a shirt pocket. The full and snug insertion means better retention. There is much less likelihood of it falling out of a shirt pocket when the user is engaged in rather vigorous activity than a thin elongated pocket camera such as the 110 format models. Also, this camera shape tends to be substantially less restrictive on the user's physical activities than a thin elongated camera.

Camera section 12 comprises a base housing section 16 having a chamber 17 therein for receiving a cassette 18 holding a stack of self-developing film units 20 (see FIG. 8). It also mounts a pair of pressure-applying rollers 22 and 24; a film advance and roller drive mechanism 26; a lens board 28 pivotally coupled to base section 16 for movement between folded and extended positions and mounting an objective lens 30, a lens focusing wheel 32, a photocell detector window 34 and other exposure control devices including a shutter to be described later; and a folding bellows 36 coupled between base section 16 and lens board 28 and cooperating therewith for excluding ambient light from the optical path between lens 30 and the film plane. Section 12 also includes a folding two-element reverse Galilean viewfinder comprising a forward or objective lens 38 mounted on lens board 28 for movement between its upstanding erected operative position shown in FIG. 1 and a folded position shown in FIG. 7 where it is seated in a recess 40 in lens board 28 and a rear or eye lens 42 mounted on base section 16 for movement between the upstanding erected position shown in FIG. 1 and a folded position (see FIG. 7) where it is seated in a recess 44 in the top wall of housing 16. FIG. 1 also shows a camera cycle start button 46 mounted on the top wall of housing 16 adjacent lens 42.

The film cassette 18 for holding a stack of film units 20 is basically a box-like structure, preferably of molded plastic construction, comprising a forward wall 48, a rear wall 50, and a peripheral section including a pair of side walls 52, a leading end wall 54 and a trailing end wall 56. Forward wall 48 has a generally square exposure aperture 58 therein which is coextensive with the square image forming area 60 of film unit 20. As best shown in FIG. 8, the cassette 18 also includes ane elongated pick access slot 62 running rearwardly adjacent the lower edge of forward wall 48 to a point partway down trailing end wall 56. Located in the leading end wall 54 is a laterally extending film withdrawal slot 66.

Camera 10 is preferably configured for use with small format self-developing film units 20 of the color transparency or "instant slide" type and therefore camera section 14, when extended, generally serves as both a light excluding imbibition chamber and a film retention chamber.

However it is within the scope of the invention to use reflection print or other type film units 20 which have a self-contained opacification system and may be advanced directly into ambient light after fluid distribution without fogging. In this case, section 14 serves as only a film retainer. That is, its light excluding capability is not required for film processing. For an example of a suitable reflection print film unit see U.S. Pat. No. 3,615,644 issued to E. H. Land and assigned to the same assignee as the present invention.

As best shown in FIGS. 6 and 8, the illustrated transparency film unit 20 is of the "integral" type which may be exposed and processed without having to superpose and/or peel apart separate negative and positive elements.

Film unit 20 is generally square in shape having a generally square image forming area 60 which is bordered by an integral frame 68 including, at one end, a rupturable container or pod 70 holding a supply of fluid processing composition 72. In a preferred embodiment, film unit 20 measures approximately 2" × 2" and has an image forming area 60 of approximately 35 mm × 35 mm. It will be understood however that a camera 10, embodying the present invention, may be designed and scaled up or down for use with film units having larger or smaller dimensions than the approximate measurements set forth above.

For the sake of clear illustration in FIG. 6, film unit 20 is shown to comprise two superposed sheet-like elements 74 and 76 having pod 70 attached to one end thereof. In actuality, the film unit 20 is preferably a multilayer laminate including, among other layers, photosensitive and image-receiving layers and elements 74 and 76 may each comprise a plurality of layers.

Subsequent to exposure, film unit 20 is adapted to be advanced between a pair of pressure-applying members, such as the pair of rollers 22 and 24 shown in FIG. 6 which apply a compressive pressure progressively along the length of the film unit 20 thereby rupturing pod 70 and distributing the fluid processing composition 72 between a pair of predetermined layers of the film unit 20 (as illustrated by the interface between elements 74 and 76) to initiate a well-known development and diffusion transfer process.

In a preferred embodiment, film unit 20 is a transparency type self-developing film unit which provides a full color positive image for viewing or projection by transmitted light. Also, the integral frame 68 surrounding the image-forming area 60 is preferably sufficiently stiff such that the processed film unit 20 may be manipulated in an automatic projector without requiring the film unit 20 to be mounted in an auxiliary slide holder frame or mount.

The illustrated film unit 20 is also of the type which does not include a total integral light opacification system and must be held in a light-free environment for a short imbibition period following fluid distribution to prevent further exposure of its photosensitive materials while the development process is in progress.

For representative examples of transparency type self-developing film units which may be used with camera 10, reference may be had to U.S. Pat. Nos. 3,536,488; 3,615,428; 3,647,437; 3,721,562; 3,730,716; and 3,894,871, all of which are assigned to the same assignee as the present invention.

The film units 20 are stacked in cassette 18 behind forward wall 48 with the image-forming areas 60 of the film units in facing registration with the cassette exposure aperture 58. The stack is biased toward forward wall 48 by a spring platen (not shown) so that the forwardmost film unit 20 in the stack bears against the interior surface of forward wall 48. When cassette 18 is located against later-to-be-described bearing surfaces in the camera chamber 17, the exterior and interior surfaces of forward wall 48 serves as reference bearing surfaces to accurately locate the forwardmost film unit at the camera's film or exposure plane.

After the forwardmost film unit 20 is exposed through cassette aperture 58, a later-to-be-described camera pick enters pick slot 62, engages the trailing edge corner of the film unit and advances it (to the right as viewed in FIG. 8) through the film withdrawal slot 66 and into operative engagement with rollers 22 and 24.

Initially provided in cassette 18, but not shown in the drawings, is a dark slide which covers and light seals cassette aperture 58 and slots 62 and 66 to prevent fogging of the film units 20 while the cassette is outside of camera 10. Once the cassette is loaded in chamber 17, the dark slide is ejected from the cassette in the same manner as a film unit.

Transparency film units have transparent base materials and some portion of the light incident upon the image-forming area 60 during exposure will be transmitted therethrough during exposure. Some self-developing cameras employ a storage chamber for holding a stack of transparency film units or a cassette adjacent the exposure position. Prior to exposure, a film unit is advanced from the storage chamber or cassette to the exposure position thereby eliminating the problem of fogging the next underlying film unit in the stack when the forwardmost film unit is exposed.

In the illustrated camera 10 it is desirable to keep the camera configuration as compact (square vs. thin elongated housing) as possible. Therefore the off to the side storage chamber is eliminated and the film units 20 are exposed while stacked in the cassette 18. In order to protect the next underlying film unit 20, each film unit 20 in cassette 18 will include a strippable opaque backing sheet (not shown) covering the back side of the image-forming areas 60. After processing this protective sheet is merely stripped off and discarded.

The base section 16 is preferably a molded plastic structure formed by wall sections including a forward wall 80, a rear wall 82 spaced rearwardly of and in parallel relation to forward wall 80 and a peripheral section joining walls 80 and 82 and including a top wall 84, a side wall 86 being remote from section 14 and including a fixed upper portion 88 and a movable lower portion 90 which serves as a push handle for the film advance and roller drive mechanism 26, an opposing side wall 92 that is set back from the end of section 16 which communicates with or telescopes into section 14, and a bottom wall section 94 extending between the bottom of fixed side wall portion 88 and the side wall 92.

Access to the cassette receiving chamber 17 is provided by a door 96 pivotally coupled to rear wall 82 at pin 98 for movement between the closed position of FIG. 2 wherein the exterior of door 96 is flush with the exterior surface of rear wall 82 and an open position where door 96 pivots outwardly about pin 98 and is located in a plane that is substantially normal to the plane of rear wall 82. A spring loaded latch button type assembly, as suggested at 100, is provided on the opposite end of door 96 and side wall portion 88 to releasably secure door 96 in its closed position.

Chamber 17 is defined, in part, by interior structure or means for accurately locating a film unit (the forwardmost film unit 20 in cassette 18) in position for exposure. The film unit 20 is located at the film or focal plane by accurately locating the cassette 18 with respect to the camera's objective lens 30 because the position of the forwardmost film unit 20 with respect to the cassette is accurately established by the interior surface of cassette forward wall 48.

As best shown in FIGS. 2 and 3 the means for locating a film unit 20 in position for exposure included structure defining a generally square open back support frame into which the cassette 18 is inserted. The support frame is defined by a forward wall 102 having an opening 104 therein that is at least coextensive with exposure aperture 58 of cassette 18; a portion 106 of the upper interior surface of base section bottom wall 94; interior surface portion 108 of fixed side wall 88; an underside surface portion 110 of top wall 84; and an interior surface portion 112 of side wall 92.

The forward wall 102 of the support frame is set back from, and in substantially parallel relation to, the forward wall 80 of base section 16 to define a space 114 therebetween in which a portion of the lens board 28 and the bellows 36 are stored in their folded configuration. Wall 102 extends laterally between the interior of the fixed base side wall section 88 and a forward portion 116 of the opposite side wall 92. Vertically, wall 102 extends between the top wall 84 and the bottom wall 94. It will be noted in FIG. 3 that the lower portion of wall 102 is slightly L-shaped such that it makes contact with the fully inserted cassette 18 above the pick slot 62 and then extends slightly forwardly of the cassette forward wall 48 before turning downwardly to join the forward upper surface of bottom wall 94 of base section 16. This L-shape construction results in a light sealed lateral channel 118 in facing relation and communication with the pick slot 62 that provides access for a later to be described film advancing pick forming part of the film transport and roller drive mechanism 26.

In operation the exterior surface of forward wall 48 of cassette 18 bears against the rearmost surface of wall 102 to accurately locate the cassette 18 and the forwardmost film unit 20 therein with respect to lens 30 in the direction of the optical axis OA. The correct horizontal and vertical orientation of the cassette is provided by the frame bearing surfaces 108 and 112 against which the trailing end wall 56 and the leading end wall 54 bears against, respectively, and the top and bottom frame bearing surfaces 110 and 106 against which the opposed side walls 52 of the cassette 18 bear.

It will be noted the pressure-applying rollers 22 and 24 are mounted in a vertical opening 119 in base section side wall 92 that communicates with the support frame such that the bite line between the rollers is in alignment with the film withdrawal slot 66 of the cassette 18 located in its operative position in the support frame, and that bearing surface 112 stops short of the forward portion 116 of wall 92 to provide a portion of the communicating opening through which a film unit 20 emerging from slot 66 advances to become operatively engaged by the rollers 22 and 24.

The cassette 18 is maintained in the support frame by a spring assembly 120 mounted on rear door 96. It presses against the rear wall 50 of cassette 18 when door 96 is closed. Assembly 120 also serves as a holder and contact assembly for a generally square flat and thin battery 122 for powering the camera's electrical system.

The spring assembly 120 comprises a pair of leaf spring elements 124 and 126 which proceed in an elongated S shape from their respective free ends to a terminal Z shaped flange that bends around the edge of battery 122 and is secured to the interior of door 96 adjacent pin 98. The spring elements 124 and 126 are formed of an electrically conductive material, such as copper, and are electrically insulated from one another by the molded plastic door 96.

When door 96 is open, the battery 122 may be easily and slidably inserted into the position shown in FIGS. 2 and 3 by inserting the leading edge of the battery 122 between the free ends of elements 124 and 126 and the interior surface of door 96 and pushing it inwardly to its fully inserted position. Spring elements 124 and 126 are normally biased towards door 96 and with battery 122 fully inserted they are in a stressed condition and provide sufficient compressive forces on battery 120 to hold it in place by means of friction.

When the battery 122 is fully inserted, the free ends of elements 124 and 126 press against and electrically contact, respectively, the + and − battery terminals 128 and 130 on the forward facing flat side of battery 122 (see FIG. 3). Electrical components of the camera are electrically connected to the elements 124 and 126 by means of small flexible wires, or printed circuit-type flexible conductors (not shown), which are electrically coupled to the electrically isolated elements 124 and 126 near their connection to door 96.

For an example of a thin flat battery that is suitable for use in camera 10, reference may be had to U.S. Pat. No. 3,988,168 issued on Oct. 26, 1976 to L. O. Bruner, said patent being assigned to the same assignee as the present invention.

The lens board 28 and bellows 36 assembly are best shown in FIGS. 1, 2, 3 and 7.

The lens board 28 is preferably a molded plastic structure comprising a top wall 132 having recess 40 integrally formed therein; left and right (as viewed in FIGS. 1, 2 and 3) side walls 134 and 136; a leading end wall 138 and a short rearwardly extending bottom wall 140.

Base section forward wall 80 has a generally rectangular opening access 142 therein in alignment with wall 102 and extending downwardly to the bottom of base section side walls 86 and 92. Thus it will be apparent that the storage space 114 for lens board 28 and bellows 36, in the folded configuration, includes the open space between walls 80 and 102 as well as the open space below base section bottom wall 94 extending between the lower section 90 of base side wall 86 and the lower section of base side wall 92.

The trailing ends of side walls 134 and 136 serve as flanges for pivotally coupling the lens board 28 to base section 16 for movement between its folded and erected positions. As best shown in FIG. 2, the side walls 134 and 136 are pivotally coupled to base section side walls 88 and 92, respectively, by means of the pivot pins 144 and 146.

It will be noted that left side wall 134 is slightly larger (in terms of the distance it depends from the left lateral edge of top wall 132) than side wall 136 and an elongated vertical slot 148, to the rear of pin 144 and forming part of storage space 114, is provided to accommodate the bottom edge of this side wall when lens board 28 is folded. The reason for the increased size has to do with more effectively releasably securing the lens board and bellows in the erected position and will be explained later.

The forward ends of side walls 134 and 136 depend further below wall 132 than the other portions thereof and in cooperation with the leading end of top wall 132, leading end wall 138 and bottom wall 140 they form a compact, open back component mounting housing 150 at the leading or forward end of lens board 28. After the later-to-be-described components are mounted in housing 150, the back opening is partially closed by a forward bellows retainer plate 152 having a central opening 154 therein in alignment with the optical path OA from lens 30 to the forwardmost film unit 20 located in position for exposure at the film plane.

The bellows 36 is formed of a very thin and flexible elastic, light opaque material such as EPDM rubber. It is formed as a 4-sided generally square or rectangular cross-section hollow tube extending rearwardly under the lens board 28 from the back of housing 150 to the forward aperture wall 102 in base section 16. The forward open end of bellows 36 is secured to the front retainer plate 152 on the back of housing 150 while the trailing open end is secured to wall 102 by a thin open frame rear retaining plate (not shown). The top surface of bellows 36 is secured, such as by adhesive bonding, to the underside of lens board top wall 132. A generally square opening is provided in this bellows surface to provide clearance for the depending recess 40 in wall 132.

The side and bottom walls of bellows 36 are preferably slightly taut when the lens board 28 and bellows 36 are erected as in FIGS. 1, 2 and 3 to maintain these bellows walls in a generally planar condition. For this purpose, and to facilitate folding, the bellows 36 includes a pair of elongated folding leaf spring assemblies 156 which extend along the intersections of the bellows bottom and side walls between the forward and rear bellows retaining plate. Each spring assembly 156 includes a forward and rear section 158 and 160 having one end secured to a bellows retaining plate and the facing opposite ends coupled together by means of an over center pivoting toggle connector 162. The bellows bottom wall is secured to these springs 156 at a point just to the rear of connector 162.

The means for releasably mounting the lens board 28 and bellows 36 in the erected operative position include the spring assemblies 156 and a latching detent formed by an integrally formed and slightly protruding pin 164 on base side wall section 88 below pivot pin 144 and a cooperating pin receiving recess 166 (see FIG. 2) on the lower end of lens board side wall 134. The side wall 134 is larger than the opposite side wall 136 for the express purpose of spacing the latch detent further away from pivot 144 to increase the length of the lever arm of the detent relative to pivot pin 144 thereby increasing holding power to resist a given closing force. The side wall 134 is configured to be just slightly flexible thereby allowing the end of the wall 134 to be cammed into and out of latching relation with the pin 164. The lens board and bellows is releasably retained in the folded or retracted position of FIG. 7 by a similar latch detent formed by an integrally formed pin 168 on base section side wall 90 and a cooperating recess 170 on the forward portion of side wall 134.

The viewfinder, as previously noted, is preferably of the reverse Galilean type comprising the forward negative lens element 38 and the rear positive lens element 42. Both lens elements may be of either glass or plastic construction. The rear lens 42 is shown mounted in a retaining frame 172 which may be integrally molded if lens 42 is plastic. Otherwise, a glass lens 42 may be insert molded into frame 172.

The forward lens 38 is pivotally mounted in the forward end of recess 40 by a pivot pin 174 (see FIG. 3) for movement between its upstanding erected operative position of FIGS. 1, 2 and 3 wherein it is optically aligned with the erected rear lens 42 and the field of view defined by objective lens 30 and the folded position of FIG. 7 wherein it is located within the confines of recess 40 so that its forward flat surface 176 is just slightly below or flush with the top surface of lens board top wall 132. Preferably recess 40 has an integrally formed lens erecting leaf spring 178 at the bottom thereof having its upstanding free end under the bottom of lens 38 for erecting and releasably maintaining lens 38 in the erected position. A latching detent system (not shown) is provided on lens 38 and in recess 40 to releasably secure lens in the folded position of FIG. 7. A thumb depression 180 extending from the exterior surface of wall 132 into recess 40 is provided to facilitate grasping the top edge of lens 38 to pivot it about pin 174 to release the holding detent when lens 38 is to be erected.

The frame 172 surrounding lens 42 is pivotally mounted at the rear of recess 44 by a pin 182 (see FIG. 3) for movement between its upstanding erected position of FIGS. 1, 2 and 3 wherein it is in operative optical alignment with the erected forward lens 38 and the folded position of FIG. 7 wherein frame 172 and lens 42 are located within the confines of recess 44 with the back surface 184 slightly below or just flush with the top exterior surface of base section top wall. An erecting spring 186, thumb depression 188 and latching detent system (not shown) are provided for frame 172 and lens 42 similar to those described above in connection with lens 38.

To fold camera section 12 the forward and rear lens 38 and 42 are manually pivoted into their respective recesses 40 and 44. The detent latches (not shown) releasably maintain the viewfinder elements in the folded position against the bias of the erecting springs 178 and 186. Next the lens board 28 is unlatched by manually pushing inwardly on the side wall 134 at a spot designated 190. Because the plastic wall 134 is slightly resilient the inward push deflects wall 134 (to the right as viewed in FIGS. 1 and 2) to disengage the recess 166 from detent pin 164. Once the lens board 28 is unlatched it may be manually pivoted in a clockwise direction (as viewed in FIG. 3) from the open or erected position of FIG. 3 to the folded position of FIG. 7.

Initial clockwise pivotal motion of the lens board 28 compressively loads the bellows spring assemblies 156 thereby causing the over center toggle connector 162 and spring elements 158 and 160 to pivot and move upwardly. Because the bellows is attached to spring elements at points on elements 160 just behind connectors 162, the center of the bellows follows the point of attachment and is automatically folded in a generally V-shaped fold in response to closing lens board 28. It will be obvious to those skilled in the bellows art that bellows 36 may include integrally formed predetermined fold lines and/or include interior bellows stiffen ribs and/or panels to facilitate the folding operation.

When the lens board and bellows assembly is fully folded, they occupy the previously described space 114. The bellows is folded and occupies a space within zone 114 between the forward side of wall 102 and the interior surface of lens board top wall 132. The exterior surface of wall 132 with lens 38 folded is of course flush with the exterior surface of base section forward wall 80. The component mounting housing 150 at the forward end of lens board 28 occupies the conforming space below base section bottom wall 94 between the bottom portions of base section side walls 86 and 92. The lens board is automatically and releasably latched in the folded position by the lower set of detent latch elements 168 and 170 when section 12 is fully folded as shown in FIG. 7.

To erect camera section 12, the folding procedure is reversed. The lens board 28 is grasped at section 150 and is manually pivoted upwardly in a counterclockwise direction (as viewed in FIG. 3) about pins 144 and 146 from the fold position of FIG. 7 to the erection position of FIGS. 1, 2 and 3. The initial pivoting movement unlatches the lower detent latch. As the lens board 28 pivots upwardly the folded spring assemblies 156 unfold and automatically erect bellows 36. As the lens board approaches the fully erected position, the upper detent parts 164 and 166 snap into place thereby releasably locking the lens board in place. Then viewfinder elements are then manually erected as noted before.

Camera 10 preferably includes an automatic exposure control system. The means for exposing and/or controlling the exposure of a film unit 20 located at the exposure position includes the objective lens 30, the photocell detector behind window 34 and the shutter 192, all of which are mounted in or on the component mount housing 150 at the forward end of lens board 28. The exposure control system also includes the actuating button switch 46, a flash fire system and a logic and control system.

The objective lens 30 as best shown in FIGS. 1 and 3 may be of any type suitable for the 35 mm square image forming area format of the illustrated film unit 20. It may be formed of glass or plastic or combinations thereof. It may be a single or multi-element (as diagrammatically illustrated in FIG. 3) lens. In a preferred embodiment lens 30 is a 4 element F/4 65 mm lens of molded plastic construction. Preferably it is mounted for axial movement, for focusing purposes, in response to rotating the focus adjusting wheel 32 which is coupled to lens 30 in a well known manner. It will be noted that wheel 32 is mounted in an indentation 194 in housing 150 so as not to protrude from the exterior surfaces of housing 150 and interfere with the movement of section 14 as it slides over the folded section 12 to form the protective covering. Lens 30 and photocell detector window 34 are also recessed in the wall 138 of housing 150 for the same reason.

The previously noted automatic exposure control system includes: an electronically operated shutter 192 diagrammatically illustrated in FIGS. 2 and 3 as including a pair of shutter blades behind lens 30 and their associated shutter operating components represented by a box designated S to the left of lens 30 in FIG. 2; and an electronic light sensing and system control module represented by a box designated LC to the right of lens 30.

The electronic shutter 192 may be of any suitable type common in small automatic cameras presently on the market well known to those skilled in the art. It may include one or more apertures defining light blocking and unblocking blades and it may be driven or operated by any suitable electrical device or devices such as electromagnets, solenoids, and stepping motors.

The light sensing and system control system LC includes a light sensing photocell detector behind window 34 for detecting scene light intensity, a light integrating circuit, other subcircuits for operating shutter 192 and providing flash fire signals to a flash unit socket 195 on section 14.

The camera cycle start button switch 46, the battery holder contact spring 120, and the automatic exposure control system including shutter 192 and box S, the light sensing and control module LC and flash socket are electrically interconnected as a system by means of flex circuit conductor strips (generally not shown in the drawings).

In operation camera 10 is set up in its operative configuration of FIGS. 1, 2 and 3, shutter 192 is in its normal light blocking configuration and the exposure control system is deenergized. The user adjusts the focus of lens 30 using wheel 32, views and frames the scene through the viewfinder and presses button switch 46 to initiate an exposure cycle. The closing of switch 46 electrically connects the system to battery 122 and the camera proceeds through the following automatic exposure cycle.

The normally closed shutter 192 opens unblocking optical path OA and causes image bearing light transmitted through lens 30 to impinge upon and begin exposing the forwardmost film unit 20 in cassette 18 located at the exposure position. The light sensing detector monitors scene light and feeds its output to the light integrating circuit. At a predetermined accumulated voltage level the integrating circuit provides a trigger signal indicating the end of the proper exposure interval, which is used to close shutter 192 and terminate the exposure cycle. The system automatically resets itself for the next exposure cycle and disconnects from battery 122. If the exposure requires auxilliary illumination, the LC module provides an appropriately timed flash fire signal to flash socket 195 to fire a flash unit mounted therein in a coordinated manner with the operation of shutter 192.

For a representative example of an automatic exposure control system that is suitable or readily adaptable, by those having ordinary skill in the art, for use in camera 10, reference may be had to U.S. Pat. No. 4,007,468 issued on Feb. 8, 1977 to Igor Blinow et al and being assigned to the same assignee as the present invention.

After exposure, the forwardmost film unit 20 is advanced out of cassette 18, through withdrawal slot 66, between rollers 22 and 24 for fluid distribution and into the light excluding chamber 15 defined in part by the extended section 14 for imbibition in response to the manual actuation of the film transport and processing (fluid distribution and response pressure application) mechanism 26 which is best shown in FIGS. 3 and 5 of the drawings.

Mechanism 26 includes a push handle or member formed by the lower section 90 and a movable sliding component carrier 200 mounted in a guiding slide track 202 in bottom base section wall 94 and side wall 92 and mounting a film advancing pick 204, an elongated toothed rack 206 for engaging and rotatably driving a gear 208 fixedly secured to the bottom journal shaft of roller 24 and a return or reset spring 210.

Rollers 22 and 24 are vertically and rotatably mounted in juxtaposition in the vertical opening 119 in base section side wall 92. The top journal shafts 212 and 214 of rollers 22 and 24 are rotatably mounted in suitable bearings (not shown) on the underside of base section top wall 84 and have mangle gears 216 and 218 fixedly secured thereto with their teeth in mesh for coupling rollers 22 and 24 together for simultaneous rotation, in opposite directions, in response to rotation of roller 24 when it is driven by rack 206 acting on gear 208.

The bottom journal shaft of roller 24 is rotatably mounted in a vertical bearing thereunder in side wall 92 (not shown). The roller 22 is shorter than roller 24, but is sufficiently tall in relation to the width of film unit 20 for processing. The bottom journal shaft of roller 22 is mounted in a bearing located in a horizontal wall section, in side wall 92, which extends between base section walls 80 and 82 and has a clearance slot therein for the lower portion of roller 24 just above gear 208. This structure, not shown in the drawings for the sake of visual clarity, includes the guide track channel 202 for the component mounting member 200 and the rack 206 thereon. In this manner the rack 206 may be advanced under the bottom end of roller 22 to accomplish its function of rotatably driving gear 208.

The guide track 202 is shaped to include a dove tail slot for slidably receiving an integrally formed conforming key portion on member 200. By this construction guide track 202 performs both a guiding and a retaining or mounting function for member 200.

The push tab or handle attached to the outboard end of member 202 is in fact the lower section 90 of base section side wall 86. From FIG. 1 it is apparent that it is properly shaped at the intersection with the upper section 88 to clear base section bottom wall 94 when it moves toward the rollers 22 and 24 during a film processing cycle.

The film advancing pick 204 is a small resilient sheet metal part having its lower end fixedly secured to the outboard end of member 200 and extends upwardly therefrom through a vertical laterally extending (towards the rollers) clearance slot 220 in wall 94 and into the space 118 where it terminates in an inwardly turned film engaging tab 222 aligned with and configured to extend into the pick slot 62 in cassette 18.

When member 200 and handle 90 are located in their first position, to the extreme left as shown in FIG. 1 looking at camera 10 from the front, the tab 222 is located in the trailing end of slot 62 in position to engage the lower trailing edge of the forwardmost film unit 20 in the cassette.

The toothed rack 206 is secured to the front side of member 200, for movement therewith, and is in operative mesh with roller gear 208. The guide channel 202, as previously noted, extends through base side wall 92 so that a portion of member 200 and rack 206 may extend therethrough into the imbibition chamber 15 formed in part by the extended section 14. Also member 200 has a laterally extending bore for a helical return spring 210 which is compressed when the transport and processing mechanism 26 is advanced from its first position toward the rollers and serves to return mechanism 26 to the first position upon the user manually releasing handle 90. The far end of the spring 210 is secured to a stop member 226 mounted on base section rear wall 84 beyond the roller and which extends into the bore in member 200 through a communicating vertical access slot in member 200.

The film transport and roller drive mechanism 26 operates as follows. The return spring 210 maintains mechanism 26 in its normal or first inoperative left terminal position in FIG. 1 (in FIG. 5 the first position is to the right) with pick 204 positioned to engage the trailing edge of the forwardmost film unit 20 in cassette 18. After the film exposure cycle, the user pushes on handle 90 with his thumb to advance mechanism 26 to the right toward rollers 22 and 24 in a direction substantially parallel to the film plane and normal to the optical axis OA. As the mechanism advances to the right (the left in FIG. 5), the rack 206 rotatably drives roller 24 through gear 208 in a clockwise direction about its axis as viewed in FIG. 5, the cooperating top pair of gears cause roller 22 to be driven, simultaneously, in a counterclockwise direction and the pick tab 222 engages the trailing edge of the forwardmost film unit advancing it through the cassette withdrawal slot 66 and into operative engagement (at the bite line) with the oppositely rotating rollers. The rollers 22 and 24 are suitably configured to frictionally engage the film unit 20 and advance it between and relative thereto along a predetermined path into the imbibition chamber 15 on the exit side of the rollers while applying a compressive pressure progressively along the length of the film unit to effect the discharge of the fluid 72 from pod 70 and its distribution between predetermined layers of film unit 20 in a well known manner thereby initiating the development and diffusion transfer process.

In a preferred embodiment the diameter of rollers 22 and 24 and the ratio of the gearing provided by rack 206, and gear 208 are chosen to relate to the total length of the film unit so that the following method of operation occurs. The roller drive is geared such that the film unit is advanced through the rollers at a faster linear rate than the linear rate of advancement of pick 204. That is, once the rollers 22 and 24 engage the film unit, they pull the film unit away from and out of engagement with pick tab 222. This is done to protect the rather lightly constructed but resilient pick 204 from damage if there is some initial slippage at the film/roller interface before the proper friction gripping takes place and also to physically isolate pick 204 from the film unit 20 during fluid distribution to preclude any loading on the film unit by the pick which may have an influence on the uniformity or predetermined desirable characteristics of the fluid distribution.

The roller drive and film transport gearing is also chosen so that the film unit is advanced from the cassette, between the rollers, and into the imbibition chamber 15 with a rather short drive stroke of the mechanism 26. That is, film transport and processing are effected by moving the push handle 90 only part way across (approximately $\frac{1}{2}$ $\frac{3}{4}$ depending on the choice of gearing) the space between the handle 90 located in its first position in FIG. 5 and the portion of base section side wall 92 depending below base wall 94. The second or left terminal portion (as viewed in FIG. 5) will depend on the choice of gearing which in turn is selected by considering the loading and spread characteristics of the particular type of film unit 20 chosen for use in camera 10. Once the gearing has been selected, the second position becomes a known factor and appropriate stops (not shown) to limit the travel of mechanism 26 are incorporated in camera 10. Therefore, for the purposes of the disclosure, the second position of mechanism 26 is defined as the amount of travel from the previously defined first position required to effect the movement of a film unit from the exposure position in the cassette through the rollers and into the imbibition or retaining chamber 15 on the exit side of the rollers.

At the end of the film transport and processing stroke, handle 90 is manually released by the user and mechanism 26 automatically moves from the second position to the first position under the influence of the return spring 210. As noted earlier, pick 204 is formed of a resilient material. When the forwardmost film unit is ejected from the cassette, the next underlying film unit in the cassette automatically moves up to the forwardmost position thereby deflecting the pick 204 slightly. On the return or reset stroke of mechanism 26, the deflected pick 204 rides on the new forwardmost film unit. As mechanism 26 approaches the first position the pick tab 222 clears the trailing end of the film unit and automatically springs back to its operative position behind the trailing edge of this film unit.

Section 14 of camera 10 is generally a hollow, boxlike, open-ended structure, preferably of light opaque molded plastic construction. As best shown in FIGS. 1, 3, 4 and 7, it comprises a forward wall 230, a rear wall 232 spaced in parallel relation to wall 230 and a peripheral section, joining walls 230 and 232, including a top wall 234 mounting flash socket 195, a side or end wall 236 having an access door 238 therein for unloading the film units 20 from chamber 15 and a bottom wall 240.

The side or end of section 14 opposite wall 236 is open and confronts the open end of section 12 mounting rollers 22 and 24. Section 14 is dimensioned and configured such that it slides over and conforms to the shape of the folded section 12. As shown in the drawings, sections 12 and 14 are coupled together in snug telescoping or nesting relation for relative sliding movement (when section 12 is in its folded configuration) with the end of section 12 fitting into the open end of section 14 in a snuggly fitting light tight manner between the extended position of FIGS. 1 and 2 wherein sections 12 and 14 cooperate to define the light excluding film retention and/or imbibition chamber 15 and the retracted or collapsed position of FIG. 4 wherein section 14 slides over a major portion of the folded section 12 (or the major portion of section 12 slides into and is received by section 14) and forms a protective casing or cover thereover.

In the fully extended position of camera 10, a minor portion of section 12, namely the portion extending to the right of the rollers 22 and 24 of FIG. 2, remains within the open end of section 14 and cooperates with section 14 to form the chamber 15 which is aligned with and extends outwardly from the rollers 22 and 24. Although not shown in detail in the drawings, sections 12 and 14 include appropriate cooperating stops thereon to limit the relative travel of sections 12 and 14 in directions substantially parallel to the film plane and normal to the optic axis OA to define the extended and retracted positions.

When camera 10 is fully retracted, section 14 slides over and protectively covers a major portion of the folded section 12. In this case the major portion is defined as all of the structure of the folded section 12 to the right of and including the camera actuating button switch 46. That is (as best shown in FIG. 4) when camera 10 is fully retracted, a portion or portions of section 14 protectively encloses or covers button 46, a major portion of door 96, the folded rear viewfinder lens 42, the folded front viewfinder lens 38, the objective lens 30, the lens focus wheel 32 and the photocell window 34. The minor portion 244 of section 12, to the left of button 46, that remains outside of section 14 when camera 10 is retracted is shown in FIG. 4.

As a minimum, it is highly desirable to design section 14 so that it protectively covers the optical elements such as lenses 30, 38 and 42 and window 34 to prevent damage, by breakage or scratching, or simply to keep elements from being contaminated by finger prints, dirt or dust. The illustrated camera provides additional protection to button 46, wheel 32 and door 96 thereby preventing damage to these components and also preventing their accidental or unintentional operation when camera 10 is retracted.

To move sections 12 and 14 relative to one another, section 12 is held by its minor portion 244 and section 14 is grasped at its closed end and the sections are pulled apart to open the camera and are pushed together to close it. To facilitate grasping the camera in this manner, section 244 is provided with integrally molded grooves or serrations 246 (on the left marginal edge of lens board top wall 132) and section 14 has similar grooves or serrations 248 on forward wall 230 near side wall 236. Also the end of section 14, around theperiphery of wall 236, is molded to flare out somewhat, as suggested at 250 in FIG. 3, to provide additional gripping surface area. If necessary, additional serrations such as 246 and 248 may be provided on the back side, respectively, of sections 12 and 14.

As best shown in FIG. 2, the open end of section 12 includes an inclined film deflection plate 252 extending to the right of the exit side of the rollers. Plate 252 intersects the normal (substantially linear) path of travel of a film unit 20 emerging from the exit side of rollers 22 and 24 and provides a camming and guiding surface for deflecting the film unit from the normal path toward the interior surfaces of base section rear wall 82 and chamber section rear wall 232 and onto the film withdrawal opening 254 at the end of section 14 that is normally covered by access door 238. Also to maintain or control the position of a film unit 20 in chamber 15 to facilitate its removal therefrom, section 14 is provided with a short vertical wall section 256 on wall 236 which extends into chamber 15 in a direction normal to wall 236 and parallel to walls 230 and 232 just forwardly of the spring loaded hinge 258 of door 238.

As the film unit 20 emerges from the rollers along the normal path its leading edge engages the surface 252 which cams or deflects the film unit toward the rear of the camera. The camming action induces a gentle large radius temporary bend in the film unit which may (depending on the spreading characteristics of the particular species of integral self-developing film unit used in camera 10) contribute to controlling the uniformity of fluid distribution with the film unit. The bending action also serves to guide the film unit towards a retention position at the rear of the chamber, behind members 252 and 256, where the film unit is aligned with the normally closed door 238. After the film unit has cleared the rollers 22 and 24, members 252 and 256 cooperate to form a two section barrier to keep the film units in the rear or film holding portion of chamber 15 to facilitate removal.

The momentum imparted to the film unit 20 by rollers 22 and 24 as it leaves the rollers is sufficient to propel it into the fully inserted position shown in FIG. 2 with the film unit resting against the cooperating rear walls 82 and 232. The bending action of member 252 also guides the next film unit along a path that automatically stacks the film units in chamber 15 as they emerge from the rollers. That is, member 252 inserts the next film unit between itself and a film unit 20 in the retaining and imbibition position at the rear of the chamber 15.

If the film units 20 are of the type that require a short (approximately 15 to 30 seconds) imbibition period in a light excluding environment after fluid distribution to prevent fogging, the user must wait for this period to expire before removing the film unit from chamber 15. This is done by manually opening door 238 against the bias of the hinge spring 258 and manually grasping the film unit 20 by its leading edge and pulling it out through chamber access opening 254. Of course, if film units 20 are of the type having a self-contained light opacification system, and therefore do not require imbibition to be carried out in a light excluding environment, the film unit 20 may be removed from chamber 15 immediately following its passage between rollers 22 and 24.

The film unit may be removed individually after the exposure and processing cycle or they may be left to accumulate in chamber 15 in that the rear portion thereof and the access opening 254 are designed to be large enough to accommodate all of the film units (plus the ejected dark slide) in cassette 18.

As noted earlier, chamber section 14 has a flash socket 195 on the top outboard end thereof for making flash exposures. The illustrated socket 195 is adapted to accept and sequentially fire the lamps in a multi lamp linear flash array which is marketed under the trade name Flash Bar. However, it will be understood that camera 10 may alternatively include other types of flash sockets and appropriate firing and control circuitry for accepting and firing other types of flash units such as flashcubes, other types of linear array units whether they be electrically, thermally or percussively actuated, or electronic or strobe type flash units.

The flash socket 195 (or its alternative equivalent) is preferably mounted a suitable distance away from the optic axis OA so as to minimize the well known "red eye" effect common in color pictures made with auxilliary illumination. This is accomplished in camera 10 by mounting socket 195 on the top outboard end of section 14 so that the off axis spacing is provided when section 14 is fully extended.

Figure 9:
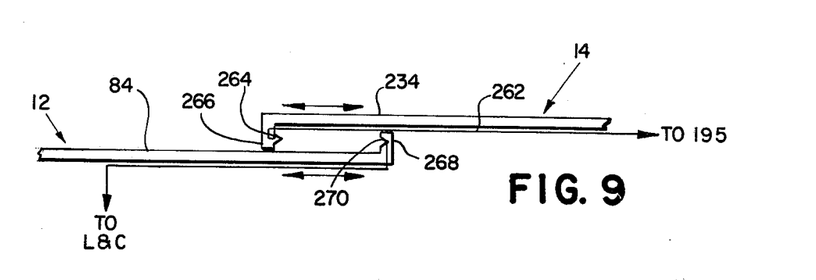
FIG. 9 is an elevational view of a portion of the camera embodying the present invention showing the flash firing contacts on the two camera sections.

The flash socket 195 is electrically connected to the logic and control system L & C preferably by means of a 2 conductor flex circuit. One portion of this circuit is shown diagrammatically in FIG. 2 as including a flex cable, having conductors or wires 260 and 262, being electrically connected at one end to socket 195. The two conductor cable runs laterally toward section 12 on the underside of chamber top wall 234 and terminates in a pair of contacts 264 (only one of which is shown in FIG. 9 in grossly exaggerated scale for the sake of clear illustration).

The contacts 264 are mounted on an integrally formed depending stop member or bar 266 on the end of chamber wall 234 which abuts against a cooperating upstanding stop bar 268 on wall 84 of section 12. These stops 266 and 268 limit the relative travel of sections 12 and 14 in the extended direction and thereby define the fully extended positions of sections 12 and 14.

Figure 10:
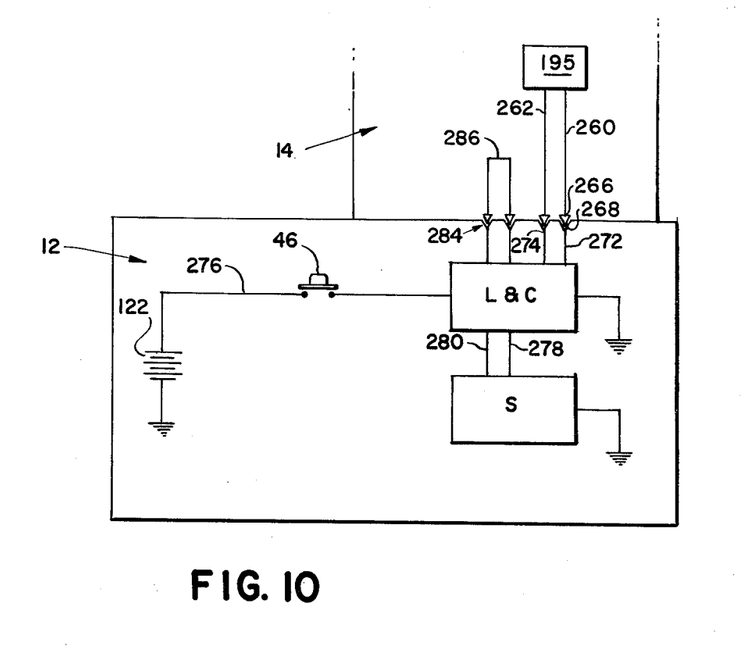
FIG. 10 is a schematic diagram of the camera's electrical system.

When sections 12 and 14 are fully extended, the contacts 264 on stop 266 engage and make electrical contact with a complementary pair of mating contacts 270 on stop 268 which are in turn connected by a flex circuit cable comprising conductors 272 and 274 which are coupled to the logic and control module L & C (see FIG. 10).

As best shown in FIG. 10, the battery 122 is connected to L & C along line 276 having the normally open switch 46 therein. L & C in turn is connected to the shutter module S over lines 278 and 280 and to the flash socket 195 when sections 12 and 14 are in the fully extended configuration.

In a preferred embodiment L & C is configured to have a normal open disenable or inhibit switch which when open prevents actuation of the exposure control system in response to actuation of switch 46. To insure that the exposure control system cannot be actuated unless camera 10 is in the fully extended position, this pair of contacts 284 of the inhibit switch are mounted on stop 268 and a shorting bar 286, for bridging contacts 284 when the camera is fully extended, are mounted on stop 266.

When sections 12 and 14 are fully extended, socket 195 is connected to L & C and the inhibit switch is closed thereby enabling operation of the exposure control system in response to actuating switch 46. When the two camera sections are moved towards the retracted position, the electrical connections at the two cooperating stops are disconnected. Thus unless the camera is fully extended, not only is the flash system disenabled, but the entire exposure control system is disenabled as well.

To close camera 10 or to change it from the erected and extended position of FIG. 1 to the folded and retracted position of FIG. 4, the first step is to close or fold section 12 in the manner described in detail heretofore. One section 12 is folded to the configuration of FIG. 7, the camera is retracted by pushing sections 12 and 14 together. Because the extended lens board 28 and bellows 36 and lens 30 are in the path of travel of chamber forward wall 230, it is obvious that section 12 must be folded before sections 12 and 14 are moved to the retracted position.

From FIG. 2 it is apparent that as the sections 12 and 14 are retracted the lateral dimension of chamber 15 becomes progressively smaller. If the user forgets to move any film units 20 from chamber 15 before he starts retracting sections 12 and 14, it is obvious that the film units will buckle and jam in chamber 15 and possibly suffer major damage. To prevent this from happening, camera 10 includes means responsive to movement of sections 12 and 14 from the extended position toward the retracted for automatically ejecting the film units 20 from chamber 15 to prevent jamming or picture damage. The automatic ejection means included a vertical surface 290 on base section side wall 92 facing the interior of chamber 15 and the spring loaded door 238 at the opposite end of the chamber 15. Stop surface 290 faces and is aligned with the door 238 and the end of the stack of film units 20 therebetween. The spacing between surface 290 and door 238 is somewhat longer when the camera is extended than the length of a film unit 20.

As the camera is retracted, the surface 290 and door 238 converge. They contact respectively the trailing and leading edges of the film units and align the stack. When these two surfaces are spaced a distance apart equaling the length of the film unit, one end of the stack bears against surface 290, the other end against the door 238 which is spring biased to its closed position. As the sections 12 and 14 are moved closer toward the retracted position, the reactive force provided by the stack of film units in response to the compressive force applied thereto by the converging surfaces forces door 238 open against the bias allowing the stack to emerge from chamber 15 through opening 254 in response to the pushing action of surface 290 on the trailing end of the stack as the camera sections 12 and 14 are moved closer to the fully retracted position of FIG. 4.

The illustrated camera 10 is shown to include a manually actuable roller and pick drive system. It will be obvious to those skilled in the art that a motorized drive system may be utilized in camera 10 with appropriate modification.

Also the illustrated camera 10 is shown with conventional optics for film exposure. It is within the scope of the present invention to provide a camera with optics that provide an additional image reversal for use with self-developing reflection print film units that require this additional reversal.

Also, it will be noted that when the lens board and bellows assembly is in said folded position, the housing at the end of the lens board blocks the operation of mechanism 26 and unblocks such operation when said assembly is erected.

Since certain changes may be made in the self-developing camera disclosed herein without departing from the scope of the invention herein involved, it is intended that all matter contained in the above description or shown in the accompanying drawings shall be interpreted as illustrative and not in a limiting sense.

What is claimed is:

1. A self-developing camera for use with self-developing film units of the type including an integral supply of fluid processing composition that is adapted to be distributed, after exposure, between predetermined layers of the film unit in response to applying a compressive pressure to the film unit, said self-developing camera comprising:

a first camera section being configured for movement between an erected operative position and a folded inoperative position and including;

a housing;

viewing means, including viewing optical means, mounted on said first section for viewing and framing a scene to be photographed;

means for locating such a film unit at an exposure position within said housing;

exposure means, including exposure optical means, for exposing the film unit at said exposure position;

pressure applying means for operatively engaging and advancing the film unit relative thereto, after exposure, along a predetermined path of travel while applying a compressive pressure progressively along the film unit to effect fluid distribution;

means for advancing the film unit from said exposure position to a position where it is operatively engaged by said pressure applying means;

a second camera section coupled to said first camera section in telescoping relation such that said first and second camera sections are movable relative to one another between extended and retracted positions, said second camera section being configured such that it cooperates with said first camera section when said first and second camera sections are in said extended position, for defining a film unit receiving chamber, located in communication with said predetermined film unit's path of travel, for receiving and releasably retaining film units advanced thereinto by said pressure applying means, said second camera section also being configured so that when said first camera section is located in said folded inoperative position and said first and second camera sections are located in said retracted position, a portion of said second camera section forms a protective cover over said viewing and exposure optical means on said first camera section, said second camera section further including a film withdrawal opening therein providing access to the interior of said chamber for the purpose of removing film units from said chamber through said withdrawal opening; and film removal means responsive to the movement of said first and second camera sections from said extended position toward said retracted position for automatically engaging and advancing any film units in said chamber through said withdrawal opening.

2. The self-developing camera of claim 1 wherein said chamber is also a light excluding imbibition chamber and said withdrawal opening is normally blocked by a door biased by a force toward a blocking position and said film removal means is operative to advance the film units through said withdrawal opening and move said door from its normal blocking position to an unblocking position against the biasing force on said door.

3. The self-developing camera of claim 1 wherein said pressure applying means includes a pair of rotatably mounted pressure applying rollers and said film advance means includes a pick movably mounted for engaging an edge of the film unit located at said exposure position and advancing the film unit into operative engagement with said pressure applying rollers.

4. The self-developing camera of claim 3 further including drive means for simultaneously advancing said pick and rotatably driving at least one of said pair of rollers in appropriate directions to effect the transport of the film unit from said exposure position, between said pair of rollers and into said chamber formed by said first and second camera sections located in said extended position.

5. The self-developing camera of claim 4 wherein said drive means is manually actuable.

6. A compact self-developing camera for use with self-developing film units of the type supplied in stacked relation within a cassette having an exposure aperture therein through which the forwardmost film unit in the stack is exposed and a film withdrawal slot through which the forwardmost film unit is withdrawn, following exposure from the cassette for processing, such film units also being of the type including an integral supply of fluid processing composition that is adapted to be distributed between predetermined layers of the film unit in response to the application of a compressive pressure progressively along the film unit following exposure, said camera comprising:

a first camera section being configured for movement between folded and erected positions and including:

a housing including a forward wall having a forward access opening therein, a rear wall having a rear opening therein, normally being closed by an access door, through which such a cassette is loaded into said camera, and a peripheral section joining said forward and rear walls and including top, bottom and a pair of side walls, said pair of side walls being configured to extend below said forward wall to define a portion of a storage space located below said bottom wall and between said pair of side walls and said top wall having a recess therein;

means for receiving and supporting such a cassette at an operative position within said housing wherein the exposure aperture in the cassette faces said forward access opening in said forward wall and the forwardmost film unit in the stack is located in position for exposure, said receiving and support means being configured, in cooperation with said forward and side housing walls to define another portion of said storage space in communication with said forward access opening in said forward housing wall;

a lens board and bellows assembly extending through said access opening and being coupled to said housing for movement between an operative erected position and an inoperative folded position wherein said lens board and bellows assembly are located in said storage space, said lens board including means for mounting exposure means including exposure optical means thereon, said lens board being configured, when erected, to locate such exposure optical means at a position for defining an optical path from such exposure optical means to a film unit located in position for exposure and said lens board and bellows being configured when erected for excluding ambient light from said optical path, said lens board also being configured to include a recess therein;

viewing means for viewing and framing a scene to be photographed, said viewing means including first viewing optical means mounted on said lens board for movement between an erected operative position and a folded inoperative position wherein it is located in said recess in said lens board and second viewing optical means mounted on said housing for movement between an erected operative position and a folded inoperative position wherein it is located in said recess in said housing top wall;

exposure means, including exposure optical means mounted on said lens board, being operative when said lens board and bellows assembly is in said erected position for exposing the film unit at said exposure position;

pressure applying means including a pair of rotatably mounted rollers for operatively engaging the film unit following exposure and advancing the film unit relative thereto along a predetermined path of travel while applying a compressive pressure progressively along the film unit to effect fluid distribution, at least one of said pressure applying rollers being configured to be operatively rotatably driven in a direction to effect such advancement of the film unit relative to said pair of rollers;

film advance means for advancing the film unit from said exposure position to a position where it is in operative engagement with said pair of rollers, said film advance means being configured to be operatively driven to effect such film advancement;

drive means being operable for operatively driving said at least one roller and said film advance means; and a second camera section coupled to said first camera section in telescoping relation for mutual movement in opposite directions between extended and retracted positions, said second camera section being a structure that conforms to the shape of said first camera section and having an opening at one end for slidably receiving said first section in its said folded position, said second camera section cooperating with said first camera section, when said first and second camera sections are located in said extended position, to form a chamber communicating with said predetermined film unit path of travel for receiving and releasably retaining film units advanced thereto by said pair of rollers, said second camera section also being configured to slide over major portions of said first section in its said folded position to form a protective cover over said exposure optical means and said first and second viewing optical means.

7. A self-developing camera for use with a self-developing film unit of the type including an integral supply of fluid processing composition that is adapted to be distributed, after exposure, between predetermined layers of the film unit in response to the application of a progressive compressive pressure across the film unit, said self-developing camera comprising:

a first camera section including:
  a substantially thin base section;
  means for receiving and locating the film unit at a focal plane within said base section;
  a lens board including an objective lens mounted adjacent one end thereof;
  means for connecting said lens board adjacent its end opposite its said one end for pivotal movement about an axis between an inoperative position wherein it is substantially disposed within said base section and an operative position wherein it extends outwardly from said base section;
  a foldable bellows connected between said lens board and said base section to cooperate with said lens board and said base section to define a light tight exposure chamber between said objective lens and said focal plane when said lens board is in its said operative position, said bellows being configured to collapse so as to be stored within said base section when said lens board is disposed in its said inoperative position;
  a pair of elongated pressure applying rollers mounted for rotation about axes extending substantially perpendicular to said pivot axis;
  means for selectively advancing an exposed film unit between said rollers to effect the spreading of the film unit's processing fluid across the exposed film unit; and a second camera section slidably connected to said first camera section in telescoping fashion for movement relative thereto substantially in a direction parallel to said pivot axis between a collapsed position and an extended position, said second camera section configured and arranged to constitute a light tight chamber for receiving the exposed and fluid treated film unit as it advances from between said rollers when said second camera section is in its said extended position and to constitute a cover precluding the displacement of said lens board from its said inoperative position into its said operative position when said second camera section is in its said collapsed position.

8. The camera of claim 7 additionally including a viewfinder mounted on said first camera section, said viewfinder including an optical element mounted for displacement between an inoperative position and an operative position, and wherein said second camera section is configured and arranged to cover said optical element when said optical element is in its said inoperative position and said second camera section is in its said collapsed position.

9. The camera of claim 8 wherein said one optical viewfinder element is mounted on said base section and said viewfinder includes another optical element mounted on said lens board for displacement between an inoperative position and an operative position and wherein said second camera section is configured and arranged to cover said other viewfinder optical element when said other optical element is in its said inoperative position, said lens board is in its said inoperative position and said second camera section is in its said collapsed position.

10. The camera of claim 7 additionally including a camera cycle start button mounted on said base section and wherein said second camera section is configured and arranged to cover said camera cycle start button and said objective lens mounted on said lens board when said second camera section is disposed in its said collapsed position.

11. The camera of claim 7 wherein said film unit advancing means includes a manually actuable member mounted for displacement back and forth along a path of travel extending substantially parallel to said pivot axis and wherein said lens board blocks said path of travel when in its said inoperative position and does not block said path of travel when in its said operative position.

12. The camera of claim 11 wherein said film unit advancing means includes a displaceably mounted member arranged to selectively advance the film unit from its position within said base section wherein it is adapted to be exposed to image carrying light rays from said objective lens towards and between said rollers and means for driving said rollers.

13. A self-developing camera for use with a self-developing film unit of the type including an integral supply of fluid processing composition that is adapted to be distributed, after exposure, between predetermined layers of the film unit in response to the application of a progressive compressive pressure across the film unit, said self-developing camera comprising:
a first camera section including:
    a substantially thin base section;
    means for receiving and locating the film unit at a focal plane within said base section;
    a lens board including an objective lens mounted adjacent one end thereof;
    means for connecting said lens board adjacent its end opposite its said one end for pivotal movement about an axis between an inoperative position wherein it is substantially disposed within said base section and an operative position wherein it extends outwardly from said base section;
    a foldable bellows connected between said lens board and said base section to cooperate with said lens board and said base section to define a light tight exposure chamber between said objective lens and said focal plane when said lens board is in its said operative position, said bellows being configured to collapse so as to be stored within said base section when said lens board is disposed in its said inoperative position;
    a pair of elongated pressure applying rollers mounted for rotation about axes extending substantially perpendicular to said pivot axis;
    means for selectively advancing an exposed film unit between said rollers to effect the spreading of the film unit's processing fluid across the exposed film unit;
a second camera section slidably connected to said first camera section in telescoping fashion for movement relative thereto substantially in a direction parallel to said pivot axis between a collapsed position and an extended position, said second camera section configured and arranged to constitute a light tight chamber for receiving the exposed and fluid treated film unit as it advances from between said rollers when said second camera section is in its said extended position and to constitute a cover precluding the displacement of said lens board from its said inoperative position into its said operative position when said second camera section is in its said collapsed position; and
said film unit advancing means including a manually actuable member mounted for reciprocal displacement along a path of travel substantially parallel to said pivot axis, said path of travel being arranged so as to be blocked by said lens board when said lens board is disposed in its said inoperative position and so as not to be blocked by said lens board when said lens board is disposed in its said operative position.

14. A self-developing camera for use with self-developing film units of the type including an integral supply of fluid processing composition that is adapted to be distributed, after exposure, between predetermined layers of the film unit in response to applying a compressive pressure to the film unit, said self-developing camera comprising:
a first camera section including:
    a housing;
    viewing means, including viewing optical means, mounted on said first section for viewing and framing a scene to be photographed;
    means for locating such a film unit at an exposure position within said housing;
    exposure means including exposure optical means for exposing the film unit at said exposure position and an automatic exposure control system including a flash fire system for use with an auxiliary source of illumination;
    pressure applying means for operatively engaging and advancing the film unit relative thereto, after exposure, along a predetermined path of travel while applying a compressive pressure progressively along the film unit to effect fluid distribution;
means for advancing the film unit from said exposure position to a position where it is operatively engaged by said pressure applying means;
a second camera section coupled to said first camera section such that said first and second camera sections are movable relative to one another between extended and retracted positions, said second camera section being configured such that it cooperates with said first camera section, when said first and second camera sections are in said extended position, for defining a film unit receiving chamber, located in communication with said predetermined film unit's path of travel, for receiving and releasably retaining a film unit advanced thereinto by said pressure applying means, said second camera section also being configured so that when said first and second camera sections are located in said retracted position, a portion of said second camera section forms a protective cover over at least one of said viewing and exposure optical means on said first camera section;
a flash receptacle on said second camera section for operatively receiving an auxiliary source of illumination, said flash recaptacle being operatively connectable to said flash fire system; and
means for automatically operatively connecting said flash recaptacle to said flash fire system when said first and second camera sections are located in said extended position and for operatively disconnecting said flash receptacle from said flash fire system when said first and second camera sections are in a position other than said extended position.

* * * * *